July 21, 1959  J. M. DODWELL  2,895,577
CLUTCH
Filed May 16, 1955  4 Sheets-Sheet 1
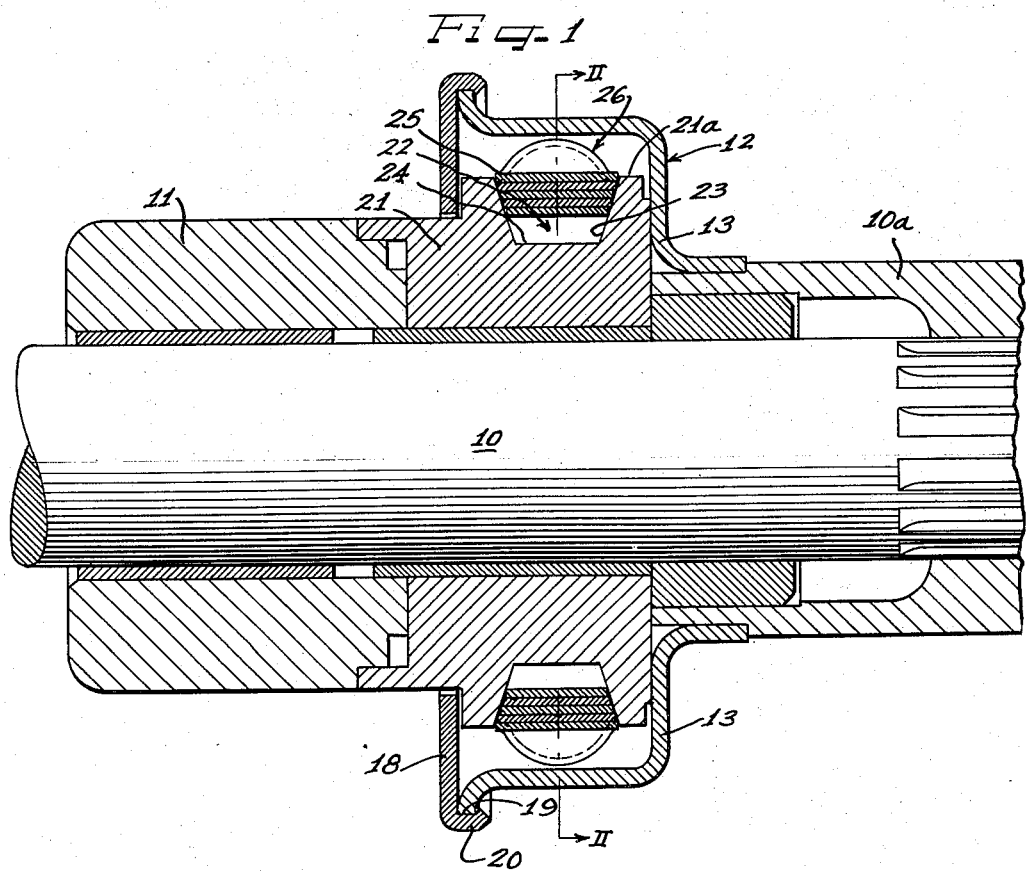
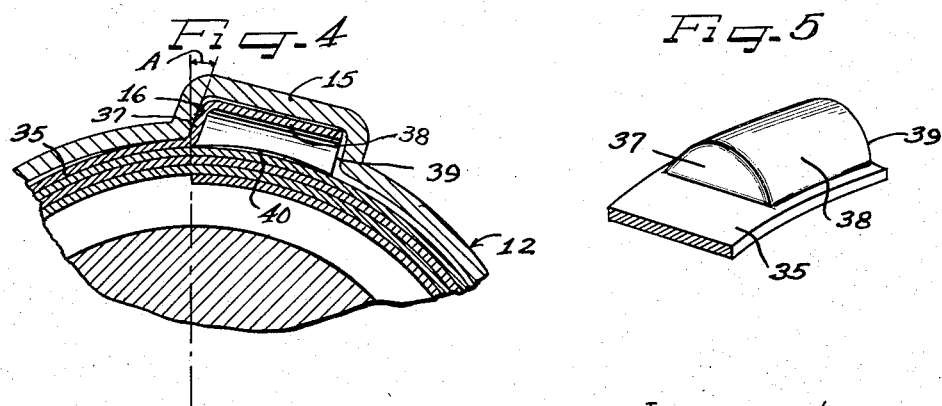
Inventor
JOHN M. DODWELL July 21, 1959 J. M. DODWELL 2,895,577
CLUTCH
Filed May 16, 1955 4 Sheets-Sheet 2
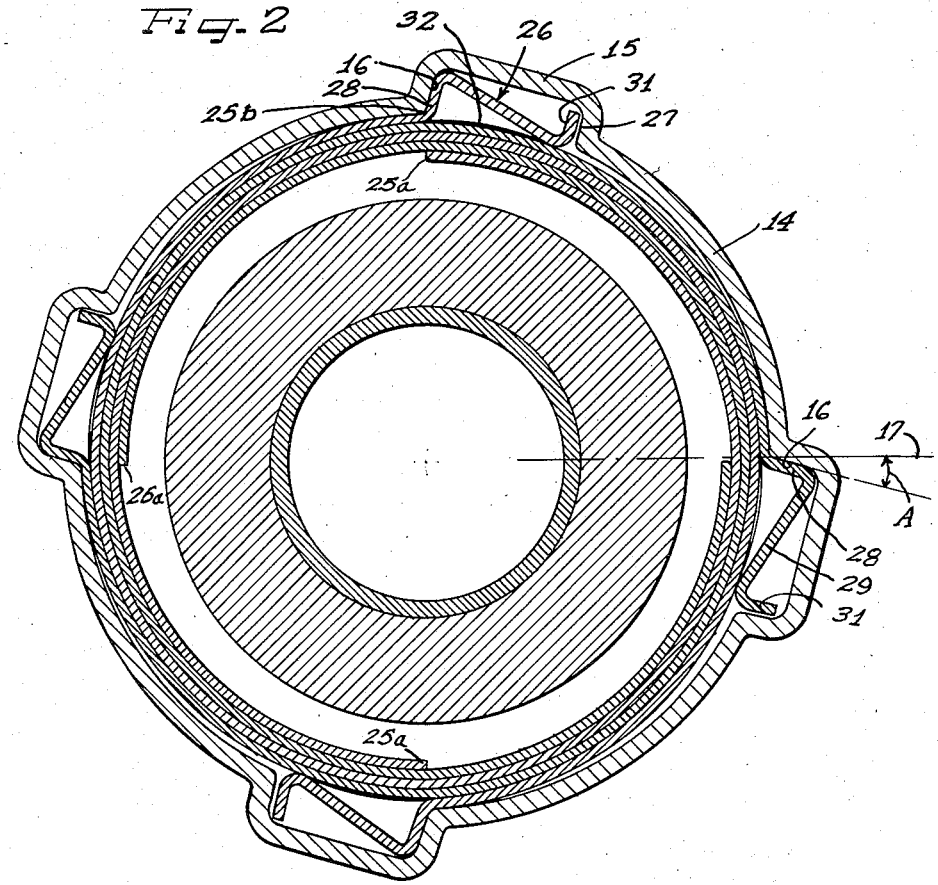
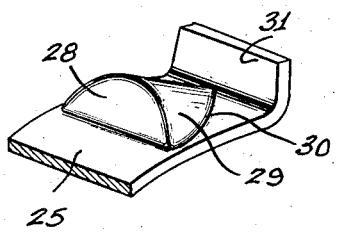
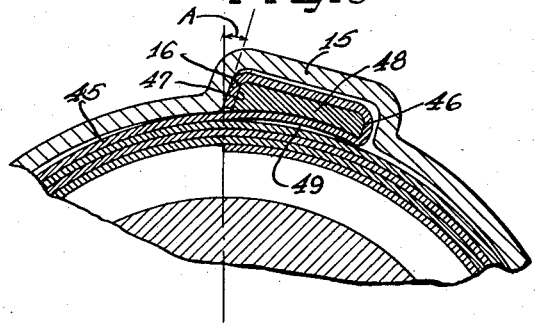
Inventor
JOHN M. DODWELL July 21, 1959 J. M. DODWELL 2,895,577
CLUTCH
Filed May 16, 1955 4 Sheets-Sheet 3
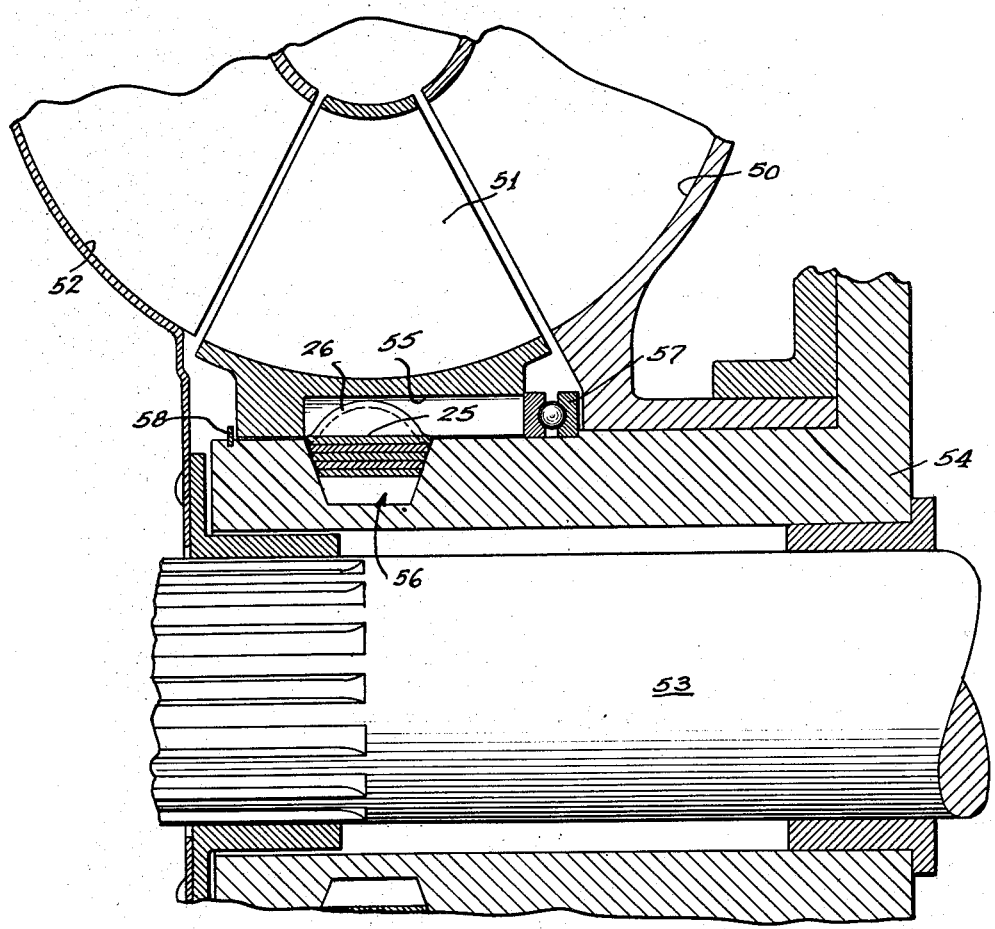
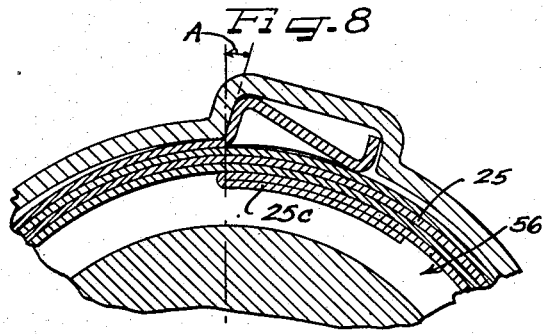
Inventor
JOHN M. DODWELL
by Attys.

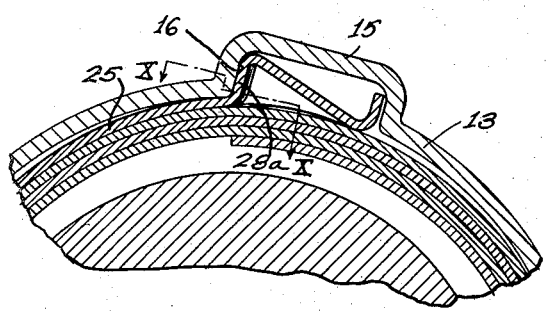
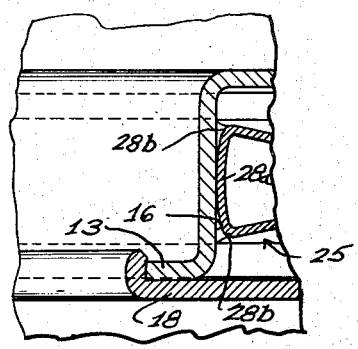
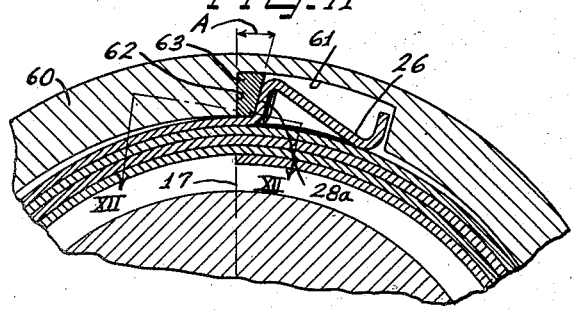
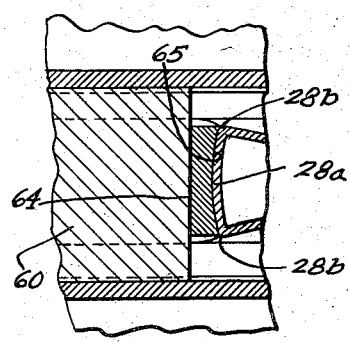
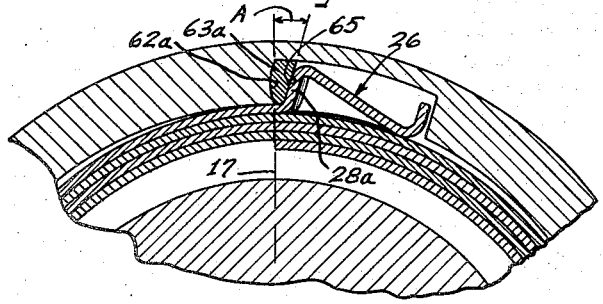

United States Patent Office 2,895,577
Patented July 21, 1959

2,895,577
CLUTCH
John M. Dodwell, Piedmont, Quebec, Canada
Application May 16, 1955, Serial No. 508,654
15 Claims. (Cl. 192—41)

The present invention relates to improvements in the art of free-wheeling or overrunning clutches and is, more particularly, concerned with the provision of a substantially improved clutch of the overlapping torque-transmitting band friction type clutch of the general type disclosed in my prior United States Patent No. 2,518,453.

As fully described in my above mentioned earlier United States patent, an overrunning or one-way clutch of very satisfactory operational characteristics may be constructed by providing a plurality of overlapping, substantially circular, bands secured to a first rotary clutch member and engageable in overlapping fashion in a V type groove in a second member to be clutchingly engaged with the first clutch member. The natural resiliency of the torque transmitting bands tends to maintain them in contact with the side wall surfaces of the V groove and the bands wedgingly grip the side walls of the V groove when the clutch parts are rotated in a direction tending to wrap the bands around the grooved member. Rotation of the parts in the opposite direction relative to each other provides a slight frictional force tending to force the overlapping bands outwardly in an unwrapping direction, thereby providing free relative rotation between the clutch parts.

It has been found that clutches constructed in accordance with my earlier patent have unusually high torque transmitting efficiency and are capable of surviving many tens of thousands of clutch-declutch cycles of operation. However, it has been found that in some specialized applications, and especially in the automotive field, where clutches must survive at least several hundred thousand cycles of operation and in some instances several millions, the bands of the type of clutch shown in my above mentioned patent may in some instances fail prematurely. In all cases brought to my knowledge, this failure has, when it occurred in the past, occurred at or adjacent the point of connection of the individual overlapping torque transmitting bands with the housing carrying the bands. Tests have shown that such failures occur as a result of fatigue induced by radial movement of the free, or unattached, overlapping ends of the bands in clutching and unclutching. This flexing concentrates at or adjacent the key or other fastening device utilized for securing the bands to the band-housing member and unless exact machining tolerances and optimum conditions of minimum wear are present, it has been found that the stresses built up may cause failure.

The present invention provides an improved mounting structure for positioning the torque transmitting bands. In accordance with the present invention, the fixed ends of the bands are secured to the band-carrying portion of the clutch in such a manner as to prevent any flexure of the bands at their point of attachment. At the same time that the elimination of flexing is accomplished, additional wedging forces are applied tending to increase the torque carrying capacity of the clutch. The simultaneous attainment of these functions is not only achieved without decreasing the efficiency of the clutch in other respects, but is also attained through a structure substantially simpler in construction and likewise substantially less expensive than my prior clutch devices.

In accordance with the teachings of the present invention, the clutch member designed to carry the overlapping bands is provided with a generally cylindrical bore having at least one substantially radially projecting, longitudinal extending slot. The second clutch member is provided with an externally facing annular V groove and at least one overlapping flexible spring metal torque transmitting band is provided with its free end in contact with the V groove and its opposite end positioned in its slot in the outer clutch member. The slot contacting end of the band is constructed to provide a slot engaging surface lying in a plane at approximately 15° to a radius line passing through the center of both clutch members and, likewise, the cooperating edge wall of the corresponding slot in the outer clutch member is inclined at an angle of approximately 15° to the radius. This inclination is, in both cases, in the direction of band movement during such energization. Thus, as the free end of the band wedgingly engages the V groove the band is pulled peripherally relative to the slots. Under such pulling, the inclination of the slot and the holding portion of the band forces the individual band to move radially inwardly thereby providing a radially inwardly directed force urging the overlapped portion of the band or overlapped portions of other similar bands into tighter engagement with the groove. Any number of similar, overlapping bands and slots may, of course, be used.

Since the secured ends of the bands are permitted to move radially, no flexure of the bands adjacent their points of securement occurs. Accordingly, fatigue failure resulting from localized flexure of the torque transmitting bands is eliminated and at the same time the torque transmitting characteristic of the clutch as a whole is substantially improved and the permissible size of the clutch operating parts reduced to a minimum.

It is, accordingly, an object of the invention to provide an improved one-way clutch.

Another object of the present invention is to provide an improved one-way clutch of the wedging, flexible torque transmitting band type.

Still a further object of the present invention is to provide an improved attachment means for the flexible torque transmitting bands of a one-way clutch whereby flexure of the individual bands at their points of attachment is substantially eliminated.

A feature of the present invention is the utilization of a simplified, radially floating, key apparatus for securing torque transmitting bands to one of the clutching members of a one-way clutch.

Another feature of the present invention is the provision of an unusually simple clutch structure having an absolute minimum radial width of operating clutch parts and cooperating clutching surfaces.

Still another feature of the invention resides in the provision of means for preventing rocking or flexing of torque transmitting bands adjacent their points of attachment.

Yet another object of the present invention is to provide a simplified dimensionally reduced one-way or overrunning clutch capable of utilization in devices requiring extraordinarily long duration, such as automotive starter clutches, transmission clutches or the like.

Still another and further object of the present invention is to provide a simplified overrunning clutch having a substantially improved torque transmitting capacity.

Still a further object of the present invention is to provide a one-way band type clutch susceptible of completely satisfactory operation with a minimum of critical manufacturing tolerances.

Still other and further objects and features of the present invention will at once become apparent to those skilled in the art from a consideration of the attached drawings wherein several preferred embodiments of the present invention are shown by way of illustration, and wherein:

Figure 1 is an elevational view in cross-section illustrating a starter motor drive application of the instant clutch;

Figure 2 is a cross-sectional view taken along the line II—II of Figure 1;

Figure 3 is partial, pictorial view of the improved clutch key construction disclosed in the instant application;

Figure 4 is a partial end elevational view illustrating a modified form of band attaching structure;

Figure 5 is a partial, pictorial view of the attachment structure shown in Figure 4;

Figure 6 is a partial end elevational view illustrating still a further modified form of band attaching structure;

Figure 7 is a partial side elevational view of a clutch constructed according to the present invention as utilized in a conventional transmission;

Figure 8 is a modified form of clutch constructed according to the present invention and utilizing centrifugal force to maintain the clutch in complete disengagement under certain operating conditions;

Figure 9 is a partial sectional view in elevation illustrating still a further modified form of the present invention;

Figure 10 is a cross-sectional view taken along line X—X of Figure 9;

Figure 11 is a partial sectional view, in elevation, of yet a further modification of the invention;

Figure 12 is a cross-sectional view taken along line XII—XII of Figure 11; and

Figure 13 is a partial sectional view of another modified form of the invention.

As shown on the drawings:

As shown in Figures 1 and 2, the present invention may be incorporated in a clutch specifically adapted for use with automotive starter motors. Thus, a starter motor drive shaft 10 is drivingly connected to a pinion gear 11 through the one-way clutch mechanism generally indicated at 12. The pinion 11 is adapted for engagement with the ring gear of a conventional engine flywheel, preferably by reciprocation of the entire clutch assembly 10a, 11 and 12 along its axis in the direction of the pinion. It will be understood, however, that insofar as the drive member 10 and the pinion 11 are concerned, as well as the engagement of the pinion with the conventional ring gear, the structures as shown in Figures 1 and 2 are conventional except as to size.

The one-way clutch 12 comprises a housing 13, 10a secured for rotation with the drive shaft 10. Preferably, the housing 13 is formed in a cup shape from sheet metal by conventional drawing processes in such a manner as to provide a peripheral wall 14 in which a plurality of radially outwardly projecting retainer pockets 15 are formed. In the drawing operation, the wall 16 of the pocket 15 is substantially planar with the plane lying at an angle, indicated at A, relative to the radius line 17. As illustrated, the angle A preferably approximates 15° and provides an important function to be described below. Rigidity and strength against radial pressures are provided to the housing 13 by means of the annular wall 18 which is turned over the peripheral edge 19 of the housing 13 as at 20. The annular member 18 and the outturned edge 19 are shown slightly exaggerated in outer diameter in order to illustrate the fastening structure but it will be understood that in actual practice the outside diameter of the member 18 and the rolled over flange 20 may be only slightly greater in diameter than the outer diameter of the retaining pockets 15.

The driven, or the output, portion of the clutch member illustrated in Figures 1 and 2 comprises a member 21 having a V groove 22 generally similar to that fully described in my earlier patent. The walls 23 of the groove 22 cooperate with at least one, but preferably, a plurality of torque transmitting bands 25 each of which is initially precurved to a diameter of curvature slightly less than the diameter of the bottom 24 of the V groove 22. This initial precurve in the bands 25, which are constructed of spring metal, assures a biasing force urging the edges of the bands 25 into wedging contact with the walls 23 at all times until such time as the walls and bands have become worn to an extent permitting the bands to actually bottom in the groove 22.

Each of the bands 25 comprises a length of spring metal of substantially constant thickness and having a slight taper to its width, thus gradually reducing its width as it approaches its free end. This permits the free end of the band to drop gradually deeper into the groove 22, thereby assuming a position of somewhat spiral form, illustrated in Figure 2. The wide, or outer end of each band is provided with a laterally or outwardly projecting key portion generally indicated at 26. The key portion 26 is constructed to project into a respective peripheral pocket 15 and is retained against rotational movement relative to the housing 12 by means of the wall surfaces 16 and 27 of the pocket.

In the embodiment illustrated in Figures 1, 2 and 3, each of the individual precurved torque transmitting bands is provided with an integral key portion in the form of a dimple which in turn takes the general form of a cylinder lying at an angle to the surface of the band and intersecting the surface to provide a portion of the cylinder having an end surface 28 and a generally cylindrical wall surface 29 which intersects the main portion of the band 25 in a curved line indicated at 30 in Figure 3. Adjacent the point at which the key dimple ends opposite to its wall surface 28, an upstanding abutment flange 31 is provided for cooperation with the rear wall 27 of the pocket 15. The portion 32 of the band 25 immediately under the dimple and in the sides thereof is slightly concave as shown in Figure 2 relative to the surface of the band 25 lying immediately therebelow. This slight concavity arises as a result of the curvature of that portion of the band to a curvature of a diameter equal to the diameter of the circle on which the under surface of the band, at the dimple, will lie in the completely worn state. In actual practice the diameter of the circle of the portion 32 would lie approximately half way between the diameter of the groove bottom surface 24 and the outside diameter of the surface 21a of the grooved member 21.

The structure and arrangement of the individual bands 25 and the keys associated therewith provide, as described, an unusually efficient clutching action with an absolute minimum of fatigue flexure to the spring metal bands. Assuming, for example, a clockwise rotation of the housing 12 relative to the member 21 as viewed in Figure 2, the narrow, free, ends 25a of the bands 25 will grip the side walls 23 of the groove 22 causing a wrapping, wedging, gripping action. This gripping action tends to pull the individual bands 25 in a counterclockwise direction relative to the clockwise moving housing 12. Relative movement between the bands 25 and the housing 12 is, however, prevented by the key 26 associated with each of the bands. As above described, the key is provided with an end face 28 which cooperates with the surface 16 in the retaining pocket 15. Both the surfaces 16 and 28 lie in a plane at an angle A to the radius line 17. The angle A is, as has been noted, approximately 15° but the function of the angle is to cause the key portion 26 to move radially inwardly relative to the clutch member 21 as a result of the peripheral pulling action in a counterclockwise direction of the band 25 relative to the housing 12. It has been found in actual practice that an inclination of approximately 15° provides very satisfactory energization of the key 26 radially inwardly upon the application of the gripping force at the bands 25 occasioned by attempted rotation of the housing 12 in a counterclockwise direction relative to the clutch member 21. It will be understood, however, that a somewhat lesser angle is operative, although requiring a somewhat greater pulling force on the band 25 for radial actuation and, further, that a larger angle may also be utilized if desired.

In view of the fact that the key 26 in its cooperation with the pocket 15 moves the fixed end of the band 25 radially inwardly relative to the clutch member 21, there is substantially no flexing of the band at the point 25b during energization of the clutch. It has been found that elimination of bending flexures of this point ordinarily occasioned, has substantially increased the number of cycles of operation obtainable from a clutch of this type. In fact, clutches embodying the principles of the present invention are capable of operation through a number of cycles in excess of conventional and substantially more costly sprag or roller type one-way clutches without failure of the band members 25.

In addition to the elimination of fatigue failures, occasioned by the generally radial movement of the secured end of the band by the cooperating surfaces 16 and 28, this generally radially inward movement provides a further important function. In its attempted radially inward movement, the key end of the band 25 provides a positive, radially inwardly directed force tending to increase the wedging pressure on the remaining bands 25 lying immediately thereunder. This increased wrapping force provides a self energizing effect which substantially increases the torque carrying capacity of the clutch without in any way affecting its one-way releasing characteristics.

The concavity 32 discussed above assures the band of freedom from bending at the point 25b which might otherwise result from a rocking action of the band about a point intermediate the point 25b and the abutment 31. By providing the concavity positive assurance is given that the key 26 will move generally radially inwardly relative to the member 21 without any rocking action as it moves along the surface 16. By providing the concavity 32 of a diameter somewhat less than the minimum diameter of the bands 25 in the most worn condition of the clutch, prevention of rocking is assured throughout the entire life of the unit.

The abutment 31 operates to prevent movement of the band 25 in a clockwise direction relative to the housing 12. Thus, upon rotation of the housing 12 in a counterclockwise direction the bands 25 are positively retained in the pockets 15. Upon such counterclockwise rotation of the housing 12 relative to the clutch member 21, an unwinding, rather than wrapping, action occurs upon frictional contact of the edges of the bands 25 with the groove wall surfaces 23 tending to maintain the bands 25 in a non-driving condition thereby permitting relative rotation between the parts 12 and 21 under such circumstances and providing the one-way action.

Modified forms of key or retaining means may be utilized for securing the bands 25 to the housing retainer pockets 15. Two satisfactory modified forms are illustrated in Figures 4, 5 and 6. As shown in Figures 4 and 5, the band 35 is provided with a substantially cylindrical dimple 36 having an end surface 37 and a generally cylindrical side wall 38 extending generally parallel to the main portion of the band 35 to the end 39 thereof. Although the dimple form shown in Figures 1, 2 and 3 is ordinarily somewhat stronger and less susceptible of deformation in use, than that shown in Figures 4 and 5, it will be apparent that the form shown in Figures 4 and 5 is somewhat less expensive and is eminently satisfactory in most uses for the clutch. It will be noted that the surface 37 is inclined from the perpendicular approximately 15° in the same manner as described relative to the surface 28. Likewise, a slight concavity 40 is provided beneath the dimple 36 to assure elimination of rocking of the dimple 36 relative to the underlying portions of the band 35 during its radially inward travel under clutch energizing conditions. Operation of the modified form shown in Figures 4 and 5 is, of course, substantially identical to operation of the form shown in Figures 1, 2 and 3 and it will be noted that the end surface 39 of the cylindrical dimple 36 performs the same function as the abutment flange 31 shown in Figures 1, 2 and 3, in preventing movement of the band 35 in a clockwise direction relative to the housing 12 as viewed in Figure 4.

It will, of course, be understood that the end 39 of the dimple 36 may be closed off by an integral stamped closure wall if desired. Such a change would add cost but increase rigidity.

The embodiment shown in Figure 6 illustrates still a further form of satisfactory band retaining key. There, the band 45 is wrapped as at 46 and 47 about a wedge shaped core 48 of metallic or other material capable of supporting the band surface 47. The surface 47 conforms generally to the surface 16 of the retainer pocket 15 in the housing 12 in the same manner as the surfaces 28 and 37 described above. Likewise, the surface 46 cooperates with the rear wall 27 of the retainer pocket 15 to prevent movement of the band 45 in a clockwise direction relative to the housing 12 as shown in Figure 6. Again, a slight concavity 49 is provided in the under side of the band 45, as described above relative to the modifications shown in Figures 1 through 5 in order to positively eliminate any tendency of the key portion of the band 45 to rock or flex relative to the free or blade portion of the band during its radial inward movement caused by cooperation of the angled surfaces 16 and 47.

It will, of course, be apparent to those skilled in the art that clutches of the type shown in Figures 1 and 2 may be embodied in numerous different applications. When applied to starter motors as suggested by the structure shown in Figures 1 and 2, the present invention provides an unusually compact clutch in which the operating parts take up a minimum of space. This compactness is achieved without requiring a diminishing of the internal diameter of the clutch member 21, thereby permitting continued use of an extremely rugged pinion 11 riding on the drive shaft 10. The external dimensions of the pinion 11 may be substantially reduced to provide for efficient operation with flywheel ring gears having greater numbers of teeth and accordingly the entire structure may be substantially reduced in size without depreciating at all from its torque carrying capacity. A comparison of the present clutch with those of the sprag and roller type heretofore generally used in the art clearly indicates the substantial reduction in outer dimensions since the outer race of such sprag or roller type clutches must be of substantial thickness to handle the tremendous bursting pressures while the outer "race" or housing 12 of the present invention need carry only nominal radial pressures. Further, the forces acting on the clutch member 21 may be applied below its surface thereby permitting a minimum diameter of the clutch member 21. At the same time these dimensional reductions are achieved, the cost of the entire unit is very materially reduced since no hardened ball bearing or sprag races are necessary and the outer housing 12, of pressed steel, effectively operates as both a housing or dirt sealing enclosure as well as a direct clutch member.

Illustrative of still further uses of the present clutch, although it should not be considered a limitation in any way, is the showing of Figures 7 and 8. As shown in Figure 7, the clutch is utilized effectively in a transmission of the conventional type utilizing a hydraulic torque converter having an impeller 50, a stator 51 and an output rotor 52. In practice, the impeller 50 is driven in any conventional manner, such as for example by the flywheel of an internal combustion engine and the rotor 52 delivers power through a centrally located output shaft 53 to planetary gearing of conventional form. The stator 51 is rotatably mounted on a braking sleeve 54 fixed to the housing of the transmission. A one-way brake is provided between the rotating stator element 51 and the sleeve 54 to permit rotation of the stator element 51 only in the direction of rotation of the impeller 50, which element has unidirectional rotation.

In the operation of torque converters utilizing a one-way brake for the stator, as illustrated in Figure 7, the initial, low speed high torque rotation of the impeller 50 causes a reaction in the stator tending to urge the stator to rotate in a direction opposite to the direction of rotation of the impeller. However, as the speed of rotation of the rotor increases and the torque multiplication ratio decreases to 1 the stator 51 begins to rotate with the impeller 50 and the rotor 52 to provide a simple fluid coupling without torque multiplication.

In the illustration shown, the stator 51 is provided with a plurality of peripheral pockets 55 in which key portions 26 of a plurality of bands 25 are positioned. The fixed support sleeve 54 is provided with a V groove 56 the walls of which cooperate with the bands 25 to provide a one-way brake. As in conventional transmissions a thrust bearing 57 controls the axial position of the stator element 51 and the retainer clip 58 retains it in central position on the sleeve 54.

By utilizing the clutch structure herein illustrated in a torque converter unit such as shown in Figure 7, a minimum diameter of the torque converter element is possible. This is true since the stator 51 need have only a very nominal internal diameter sufficient to pass over the small sleeve 54. Since the pockets 55 in the groove 56 do not need to be hardened and have only nominal bursting forces applied thereto, the ordinarily utilized hardened roller wedge races are unnecessary and have been eliminated along with their space requirements.

In uses such as that illustrated in Figure 7, it is in some instances desirable that the clutch or brake have absolutely no frictional drag during that portion of its operation when it is permitting rotation. This may be accomplished in the present clutch very readily by securing the bands 25 to the member 51 and by providing, where necessary, centrifugal weight at the free ends of the individual bands 25 as shown in Figure 8. As there illustrated, the free ends 25c of the bands 25 may be narrowed in width and turned back on themselves to provide localized weights. Alternatively, of course, separate weights may be secured to the ends of the bands 25 adjacent the bottom of the groove 56 in such a manner as not to interfere with the radially inward operation of the bands but of sufficient weight to urge the free ends of the bands outwardly when the speed of rotation of the bands themselves approaches a predetermined nominal value. In situations in which this completely free wheeling action is not considered important, it will be apparent that the clutch may be constructed with the externally facing V groove on the non-fixed member and the bands and retaining pockets on the fixed member. It will be clear, however, that in ordinary installations of the type shown in Figure 7 it is desirable to provide the bands 25 on the stator element 51 itself thereby taking advantage of centrifugal force to lift the bands away from the groove walls during the overrunning or fluid coupling operation of the device, thereby minimizing wear of the clutch parts and increasing over-all transmission efficiency.

In the several embodiments of the invention hereinabove illustrated and described the retaining end face of the band retaining key 26 is provided with a substantially plane surface, indicated at 28, 37 and 47 in respective Figures 2, 4 and 6. In order to relax the machining tolerances required for the instant clutch this plane surface which lies generally transversely of the band 25 may be modified as shown in Figures 9 through 13 to contact the cooperating pocket wall 16 in a universal manner.

In Figures 9 and 10 the face 28a is slightly rounded to contact the planar pocket wall 16 along a line of contact extending generally radially outwardly of the clutch housing and positioned substantially at the transverse mid point of the surface 16. This central contact provides a certain amount of initial universal action and permits the bands initially to properly align themselves without inducing undue stresses at one or both of the corners 28b. During high torque clutch operation this slightly rounded construction of the surface 28a may substantially flatten out to provide complete surface contact between the pocket surface 16 and the surface 28a.

In Figures 11, 12 and 13 an additional and oftentimes desirable improvement is incorporated. In Figures 11 and 12, the outer clutch housing member 16 is provided with at least one and preferably a plurality of pockets 61 having a planar front keying face 62 lying in a plane generally radial of the axis of rotation of the clutch. Instead of providing for contact directly between the clutch band arcuate keying surface 28a in the manner shown in Figure 10, a separate floating abutment 63 is provided. As may be seen from Figures 11 and 12 the key 63 is wedge shaped and is provided with a substantially planar front face 64 and a segmental cylindrical, straight rear face 65 for a substantial surface contact with the segmental cylindrical arcuate surface 28a of the clutch band. As before, the surface 28a is provided on a slant, illustrated at angle A relative to a radial line 17 and accordingly the application of torque to the ends of the clutch band tending to pull it in a counterclockwise direction, relative to the housing 60 will cause the band to move radially inwardly while any slight tendencies toward misalignment axially of the axis of clutch rotation will be compensated for by slight pivotal movement of the band in the seat 65.

The insert abutment 63 may, of course, be fixed in the pocket 61 but it is preferred that it be floating, thereby permitting slight axial movements of it to permit its automatic seating in the most advantageous spot directly over the clutch groove 22. Further, by constructing the abutment member 63 of hardened steel or the like it is possible to construct the housing 60 of such light weight metals as aluminum or the like without the need for an internal steel ring member to take the clutch loads. This is an extremely important feature since it is often desired that parts such as, for example, the transmission stator member 51 illustrated at Figure 7 may oftentimes be advantageously constructed of aluminum alloys. When so constructed, and where separate steel abutment wedge 63 is provided, the wearing loads are taken up by the abutment 63 between the surfaces 28a and 65 and accordingly the need for a steel stator hub or liner having over-all hardness is eliminated. Of course, additionally, the pivotal movement permitted between the surfaces 28a and 65, as well as the slight floating, axially, of the abutment 63 permits relaxation of the manufacturing tolerances sufficient to permit a reduction in cost of the clutch more than ample to pay for the additional cost of a separate part. Further, as those skilled in the art are aware, it is ordinarily easier to manufacture slightly rounded surfaces such as employed at the surfaces 28a, than it is to provide completely planar surfaces, especially where such surfaces are required to mate with other, similar surfaces.

In Figure 13, an additional improvement is illustrated in connection with a band of the type shown in Figures 9, 10, 11 and 12. As there shown, the segmental cylindrical curved surface 28a cooperates with a wedge abutment member 63a having a segmental cylindrical curved front surface 62a and a rear segmental cylindrical curved surface 65. The surface 62a is curved about an axis parallel to the axis of rotation of the clutch while, as above illustrated in connection with Figures 11 and 12, the segmental cylindrical surface 65 is curved about an axis transverse to the axis of rotation of the clutch. In the embodiment shown in Figure 13, very slight deviations in initial forming of the clutch band, such as would cause the surface 28a to lie at an angle A relative to a radius line 17, either greater or less than the exact designed angle, are automatically compensated for. This is true since the member 63a may tilt on the surface 62a to adjust itself exactly to the preset angle of inclination of the surface 28a. This, accordingly, provides a universal pivotal action which permits surface contact between surfaces 28a and 65 without at the same time causing any deterrent whatever to radially inward movement of the key member 26. As in the case of the structure shown in Figures 11 and 12, the separate wedge 63a in Figure 13 provides for a hardened wear surface separate from the outer clutch housing 60a and accordingly that surface may be composed of a tough, though not unusually hard, substance such as aluminum alloys, non-ferrous materials, or the like without requiring substantial thicknesses of such materials.

It will thus be apparent to those skilled in the art that I have provided a novel and extremely simple and inexpensive one-way clutch or brake structure capable of operation for many hundreds of thousands of cycles without fatigue failure of the clutching parts. Further, and of great importance, the clutch or brake constructed according to the present invention has extremely satisfactory and heavy duty torque transmitting capabilities while at the same time utilizing an absolute minimum of space, compared with prior art one-way clutches of the sprag or roller type. Thus, although clutches of the type herein illustrated can be manufactured in any diameter desired, it will be apparent that the internal diameter may be a maximum and the external diameter a minimum since radial forces are kept at a minimum and the actual radial space requirement of the clutch parts themselves is small.

It will, of course, be apparent that still further modifications and variations may be made in the structure hereinabove illustrated without departing from the scope of the novel concepts of the present invention. Accordingly, it is my intention that the instant invention be limited solely by the scope of the hereinafter appended claims.

I claim as my invention:

1. A clutch comprising a first member having an externally facing peripheral V groove therein, a second clutch member having at least one internally facing pocket positioned adjacent and over said groove, a torque transmitting band associated with each pocket and having a body precurved to wrappingly engage the side walls of said V groove, and means securing one end of each said band in a respective pocket, said means comprising an outwardly projecting portion fixed to said one end and positioned in the respective pocket, said projecting portion and its respective pocket having complementary contacting torque applying surfaces lying in substantially parallel planes both of which are inclined at an angle to a radial plane defined by the axis of rotation of said members and a radius line drawn through said surfaces, said torque applying surfaces being slideable relative to each other and the planes of said surfaces being divergent outwardly away from said radial plane on the side thereof opposite from the body of said band.

2. A clutch comprising a first member having an externally facing peripheral V groove therein, a second clutch member having a plurality of internally facing pockets positioned adjacent and over said groove, a plurality of torque transmitting bands each being precurved to wrappingly engage the side walls of said V groove, and means securing one end of each of said bands in a respective pocket, said means comprising an outwardly projecting portion fixed to one end of said band and positioned in its respective pocket, said projecting portion and its respective pocket having contacting torque applying surfaces lying in substantially parallel planes inclined at an angle of approximately 15° to a plane defined by the axis of rotation of said members and a radius line drawn through said surfaces whereby peripheral movement of said band occasioned by the clutching action of said band with said V groove will cause said projecting portion to move generally radially inwardly into said groove without substantial flexing of said band at the point of juncture of said projecting portion therewith.

3. A clutch comprising a first member having an externally facing peripheral V groove therein, a second clutch member having a plurality of internally facing pockets positioned adjacent and over said groove, a plurality of torque transmitting bands each being precurved to wrappingly engage the side walls of said V groove, and means securing one end of each of said bands in a respective pocket, said means comprising an outwardly projecting portion fixed to one end of said band and positioned in its respective pocket, said projecting portion and its respective pocket having contacting torque transmitting surfaces lying in substantially parallel planes inclined at an angle to a plane defined by the axis of rotation of said members and a radius line drawn through said surfaces, said outwardly projecting portion comprising a dimple integrally formed as a part of said band.

4. A clutch comprising a first member having an externally facing peripheral V groove therein, a second clutch member having a plurality of internally facing pockets positioned adjacent and over said groove, a plurality of torque transmitting bands each being precurved to wrappingly engage the side walls of said V groove, and means securing one end of each of said bands in a respective pocket, said means comprising an outwardly projecting portion fixed to one end of said band and positioned in its respective pocket, said projecting portion and its respective pocket having contacting torque transmitting surfaces lying in substantially parallel planes inclined at an angle to a plane defined by the axis of rotation of said members and a radius line drawn through said surfaces, said outwardly projecting portion comprising a dimple integrally formed as a part of said band in the form of an outwardly projecting dimple having a substantially plane torque engaging surface and a generally cylindrical rearwardly facing supporting surface for said torque applying surface.

5. A clutch comprising a first member having an externally facing peripheral V groove therein, a second clutch member having a plurality of internally facing pockets positioned adjacent and over said groove, a plurality of torque transmitting bands each being precurved to wrappingly engage the side walls of said V groove, and means securing one end of each of said bands in a respective pocket, said means comprising an outwardly projecting portion fixed to one end of said band and positioned in its respective pocket, said projecting portion and its respective pocket having contacting torque transmitting surfaces lying in substantially parallel planes inclined at an angle to a plane defined by the axis of rotation of said members and a radius line drawn through said surfaces, said outwardly projecting portion comprising a dimple integrally formed as a part of said band in the form of an outwardly projecting dimple having a substantially plane torque engaging surface and a generally cylindrical rearwardly facing supporting surface for said torque applying surface said last named cylindrical surface terminating in a rearwardly facing abutment surface constructed for cooperation with a complementary rear surface and said respective pocket.

6. A band type one-way clutch comprising a first member having an externally facing peripheral V-groove therein, a second clutch member having a plurality of internally facing pockets positioned adjacent and over said groove, a plurality of torque transmitting bands each being precurved to wrappingly engage the side walls of said groove, means securing the outer end of each of said bands in a respective pocket, said means comprising an outwardly projecting portion fixed to said outer end and positioned in a respective pocket, said projecting portion and its respective pocket having contacting torque applying surfaces lying in substantially parallel planes inclined at an angle to a plane defined by the axis of rotation of said members and a radius line drawn through said surfaces whereby clutching engagement of said members tending to pull said bands peripherally will cause said projecting portions to move radially inwardly, and weight means secured to the inner free end of each of said bands.

7. A clutch comprising a first member having an externally facing peripheral V groove therein, a second clutch member having at least one internally facing pocket positioned adjacent and over said groove, a torque transmitting band associated with each pocket and having a body curved to wrappingly engage the side walls of said V groove, and means securing one end of each said band in a respective pocket, said means comprising an outwardly projecting portion fixed to said one end and positioned in the respective pocket, said projecting portion and its respective pocket having complementary, substantially straight, contacting torque applying surfaces both of which are inclined at an angle to a radial line drawn through a straight line of said surfaces and the axis of clutch rotation said torque applying surfaces being slideable relative to each other and diverging outwardly away from said radial line on the side thereof opposite from the body of said band.

8. A clutch comprising a first member having an externally facing peripheral V groove therein, a second clutch member having at least one internally facing pocket positioned adjacent and over said groove, a torque transmitting band associated with each pocket and curved to wrappingly engage the side walls of said V groove, and means securing one end of each said band in a respective pocket, said means comprising an outwardly projecting portion fixed to said one end and positioned in the respective pocket, said projecting portion and its respective pocket having complementary, substantially straight, contacting torque applying surfaces both of which are inclined at an angle to a radial line drawn through a straight line of said surfaces and the axis of clutch rotation, said projecting portion comprising a dimple integrally formed as a part of said band in the form of an outwardly directed straight torque engaging surface and a generally cylindrical rearwardly facing supporting surface for said torque applying surface.

9. A clutch comprising a first member having an externally facing peripheral V groove therein, a second clutch member having a plurality of internally facing pockets positioned adjacent and over said groove, a plurality of torque transmitting bands each being precurved to wrappingly engage the side walls of said V groove, and means securing one end of each of said bands in a respective pocket, said means comprising an outwardly projecting portion fixed to one end of said band and positioned in its respective pocket, said projecting portion and its respective pocket having contacting torque transmitting surfaces lying in substantially parallel planes inclined at an angle to a plane defined by the axis of rotation of said members and a radius line drawn through said surfaces, said outwardly projecting portion comprising a dimple integrally formed as a part of said band in the form of an outwardly projecting dimple having a substantially plane torque engaging surface and a generally cylindrical rearwardly facing supporting surface for said torque applying surface, said generally cylindrical rearwardly facing supporting surface terminating in an inwardly directed integral rigidifying abutment surface.

10. A clutch comprising a first member having an externally facing peripheral V groove therein, a second member having at least one internally facing pocket positioned adjacent and over said groove, a torque transmitting band associated with each pocket and having a body precurved to wrappingly engage the side walls of said V groove, and means securing one end of said band in a respective pocket, said means comprising an outwardly projecting portion fixed to said one end and positioned in the respective pocket, said pocket having an abutment insert therein, said projecting portion and said insert having complementary substantially straight contacting torque applying surfaces substantially parallel to each other, both of which are inclined at an angle to a radius line drawn through the axis of clutch rotation and said surfaces, said torque applying surfaces being slideable relative to each other and being divergent outwardly away from said radius line in the direction opposite from the body of said band.

11. A clutch comprising a first member having an externally facing peripheral V groove therein, a second member having at least one internally facing pocket positioned adjacent and over said groove, a torque transmitting band associated with each pocket and having a body precurved to wrappingly engage the side walls of said V groove, and means securing one end of said band in a respective pocket, said means comprising an outwardly projecting portion fixed to said one end and positioned in the respective pocket, said pocket having an abutment insert therein, said projecting portion and said insert having complementary substantially straight contacting torque applying surfaces substantially parallel to each other, both of which are inclined at an angle to a radius line drawn through the axis of clutch rotation and said surfaces, and said insert having means thereon for retaining said insert against radially inward movement relative to said second clutch member during the application of clutching torque, said torque applying surfaces being slideable relative to each other and being divergent outwardly away from said radius line on the side thereof opposite from the body of said band.

12. A clutch comprising a first member having an externally facing peripheral V groove therein, a second member having at least one internally facing pocket positioned adjacent and over said groove, a torque transmitting band associated with each pocket and precurved to wrappingly engage the side walls of said V groove, and means securing one end of said band in a respective pocket, said means comprising an outwardly projecting portion fixed to said one end and positioned in the respective pocket, said pocket having an abutment insert therein, said projecting portion and said insert having complementary substantially straight contacting torque applying surfaces substantially parallel to each other, both of which are inclined at an angle to a radius line drawn through the axis of clutch rotation and said surfaces, said complementary straight contacting torque applying surfaces comprising segmental cylindrical surfaces having an axis of curvature transverse to the axis of rotation of said clutch members.

13. A clutch comprising a first member having an externally facing peripheral V groove therein, a second clutch member having at least one internally facing pocket positioned adjacent and over said groove, a torque transmitting band associated with each pocket and curved to wrappingly engage the side walls of said V groove, and means securing one end of each said band in a respective pocket, said means comprising an outwardly projecting portion fixed to said one end and positioned in the respective pocket, said projecting portion and its respective pocket having complementary, substantially straight, contacting torque applying surfaces both of which are inclined at an angle to a radial line drawn through a straight line of said surfaces and the axis of clutch rotation, said substantially straight surfaces comprising segmental cylindrical surfaces having an axis of curvature extending transverse to the axis of rotation of said clutch members.

14. A clutch comprising a first member having an externally facing peripheral V groove therein, a second member having at least one internally facing pocket positioned adjacent and over said groove, a torque transmitting band associated with each pocket and precurved to wrappingly engage the side walls of said V groove, and means securing one end of said band in a respective pocket, said means comprising an outwardly projecting portion fixed to said one end and positioned in the respective pocket, said pocket having an abutment insert therein, said projecting portion and said insert having complementary substantially straight contacting torque applying surfaces substantially parallel to each other, both of which are inclined at an angle to a radius line drawn through the axis of clutch rotation and said surfaces, said complementary straight contacting torque applying surfaces comprising segmental cylindrical surfaces having an axis of curvature transverse to the axis of rotation of said clutch members, said complementary straight contacting torque applying surfaces comprising segmental cylindrical surfaces having axes of curvature extending transversely of the axis of rotation of said clutch members and said last named means comprising complementary segmental cylindrical surfaces on said pocket and said insert, the axis of curvature of said last named segmental cylindrical surfaces lying substantially parallel to the axis of rotation of said clutch members.

15. A clutch band for one-way V-pulley clutches comprising an elongated thin spring metal strip pre-curved into a generally flat radial spiral shape tapered in width along its length from adjacent its outer end to its inner end to provide a pair of progressively closer side edges for progressively deeper co-operation with the side walls of a V-pulley, key means secured to said strip adjacent its outer end on the radially outer side only thereof, said key means comprising a substantially straight torque transferring surface extending substantially radially straight outwardly away from said strip and intersecting the strip at an acute angle facing the outer end.

References Cited in the file of this patent

UNITED STATES PATENTS

| | | |
|---|---|---|
| 510,532 | Farjasse | Dec. 12, 1893 |
| 2,518,453 | Dodwell | Aug. 15, 1950 |

FOREIGN PATENTS

| | | |
|---|---|---|
| 630,835 | Germany | June 6, 1936 |